N. NILSON.
SCALE.
APPLICATION FILED FEB. 15, 1916.
1,240,084.
Patented Sept. 11, 1917.
2 SHEETS—SHEET 1.
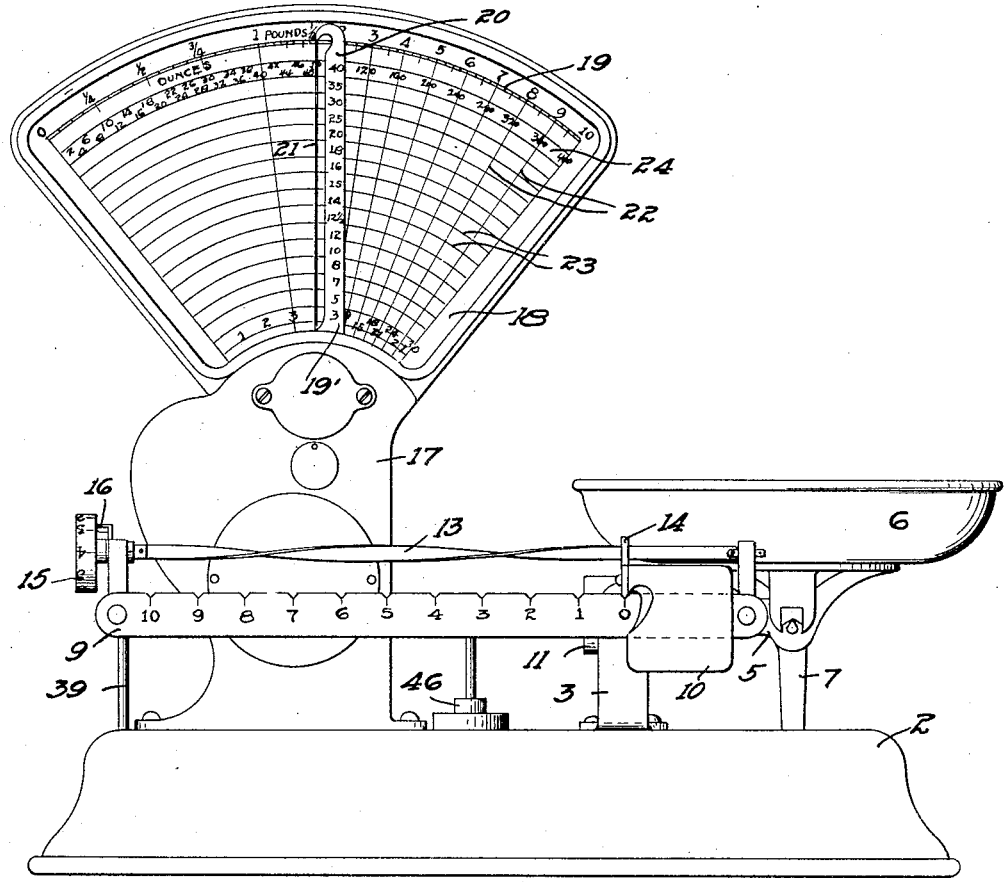
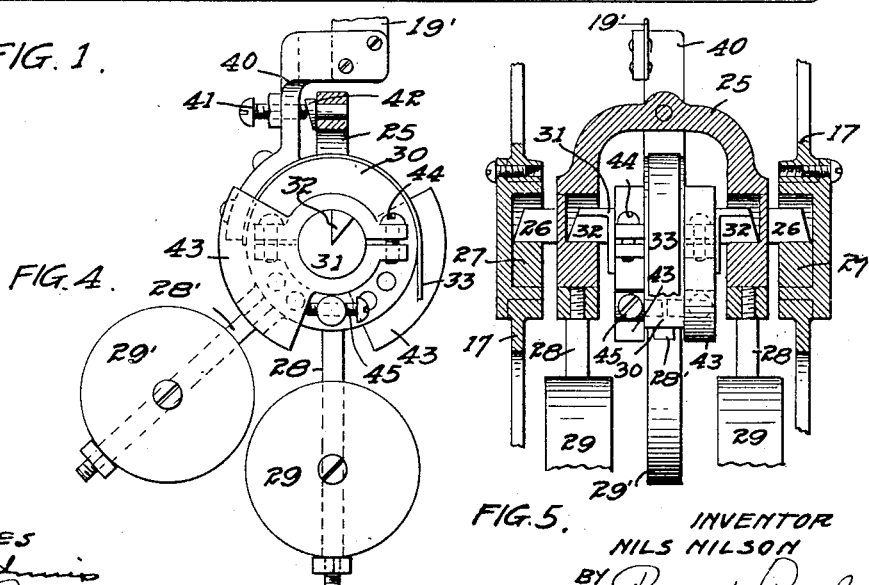
FIG. 1.
FIG. 4.
FIG. 5.
WITNESSES
INVENTOR
NILS NILSON
BY
ATTORNEYS

N. NILSON.
SCALE.
APPLICATION FILED FEB. 15, 1916.

1,240,084.

Patented Sept. 11, 1917.
2 SHEETS—SHEET 2.

WITNESSES

INVENTOR
NILS NILSON
BY
ATTORNEYS

UNITED STATES PATENT OFFICE.

NILS NILSON, OF WAYZATA, MINNESOTA.

SCALE.

1,240,084.  Specification of Letters Patent.  Patented Sept. 11, 1917.

Application filed February 15, 1916. Serial No. 78,358.

*To all whom it may concern:*

Be it known that I, NILS NILSON, citizen of the United States, resident of Wayzata, county of Hennepin, State of Minnesota, have invented certain new and useful Improvements in Scales, of which the following is a specification.

My invention relates to weighing scales and particularly to those of the computing type, and the object of the invention is to provide a scale having a dial by means of which weights in pounds and fractions of pounds can be more accurately determined than in scales of this type as usually constructed.

A further object is to provide a scale having means whereby a uniform movement of the indicator hand can be obtained in the different positions of the scale mechanism.

A further object is to provide a scale of simple but durable construction and one which will be extremely accurate and easy of adjustment.

The invention consists generally in various constructions and combinations, all as hereinafter described and particularly pointed out in the claims.

In the accompanying drawings forming part of this specification,

Figure 1 is a front elevation of a weighing scale embodying my invention,

Fig. 4 is a detail view showing the means for supporting the indicator hand, counterpoise and the adjustable weights in connection therewith, Fig. 5 is a sectional view through the bearings, showing the double arrangement of the pivots for the indicator hand and the counter-poise weights.

Figure 2:
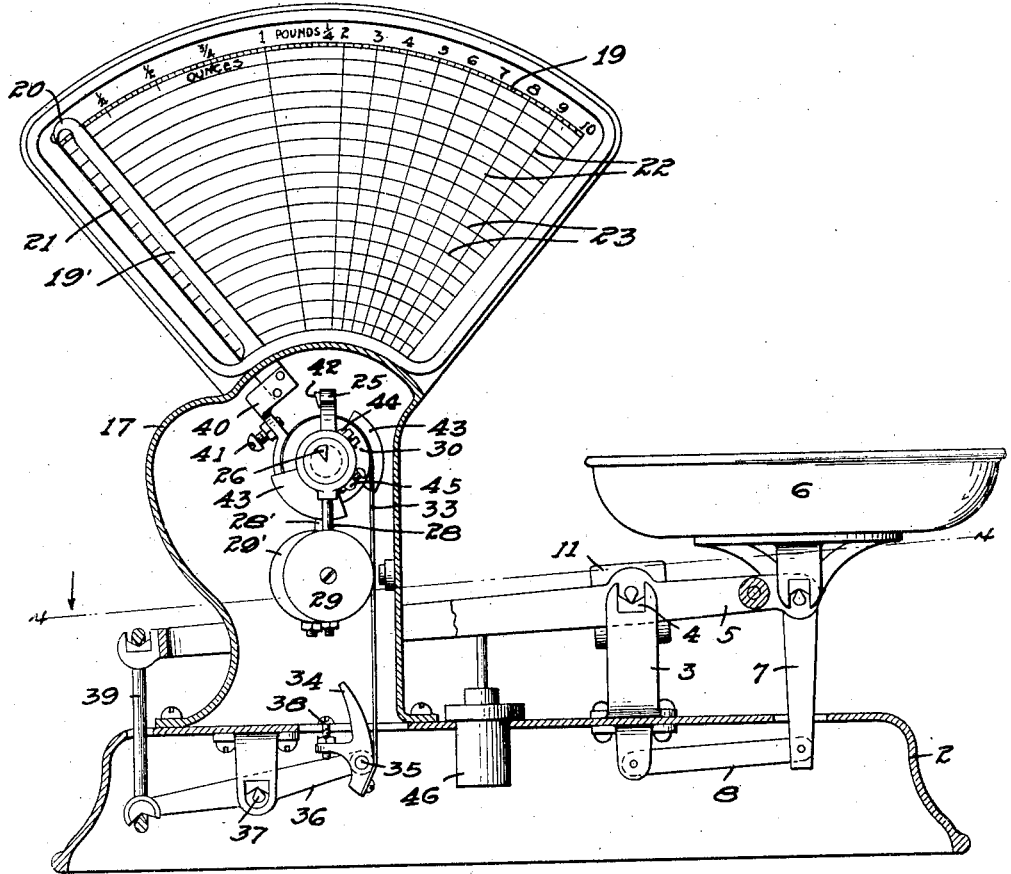
Fig. 2 is a vertical sectional view of the same.
Figure 3:
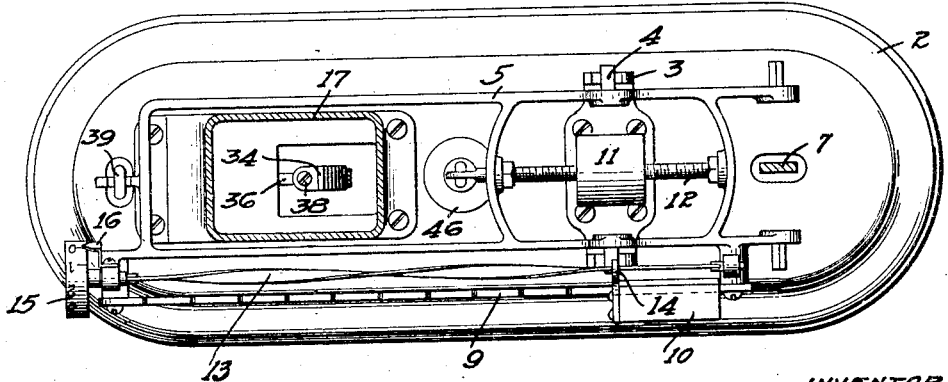
Fig. 3 is a horizontal sectional view on the line x—x of Fig. 2.

In the drawing, 2 represents a suitable base and 3 standards mounted thereon, having bearings 4 for the beam frame 5. This frame extends beyond the standards on both sides and at one end supports a scale pan 6 having a depending arm 7 that is pivotally connected with the base of the scale by a link 8, the function of which is to hold the scale pan in its horizontal position during the tilting movement of the beam. A beam proper 9 is preferably secured to one side of the beam frame 5 (see Fig. 1) and is suitably graduated and carries a poise 10 that is adapted to be moved back and forth on the beam. Between the pivots of the frame 5 is a balance weight 11 adjustable back and forth lengthwise of the frame on a screw 12.

Mounted on the frame 5 near the beam 9 is a strap 13 and a plate 14 mounted on the weight 10 is adapted to slide on this strap, the strap being twisted and rotated by the movement of the poise back and forth on the beam. At one end of the strap is an indicating disk 15 having peripheral figures thereon, arranged to revolve past a stationary pointer 16. The figures on the disk correspond to those on the beam and are visible at the front of the scale, so that the purchaser, standing on one side of the scale, can accurately determine the adjustment of the poise weight on the beam.

Mounted on the scale base is a housing 17 supporting a sector-shaped dial 18. This dial is of the price scale type and it has a line of graduations 19 at the top representing weights up to ten pounds. The space representing the first pound is graduated to ounces and fractions thereof and occupies a considerable portion of the dial on the left hand side of the vertical center thereof. On the right hand side of the dial the space is graduated in pounds, half pounds and quarter pounds, the graduations across the dial being on a curved line to conform to the arc described by the indicator hand 19'. This hand is preferably provided with a curved outer portion 20 and a wire 21 extending from the extremity of this curved portion to the base of the hand. On the face of this hand I provide a series of figures representing the price per pound and on the face of the dial are a series of lines 22 radiating to the marks representing the pound weights on the dial and adapted to register with the wire 21 as the indicator moves back and forth over the face of the dial. I also provide the face of the dial with a series of curved lines 23 concentric with the line on which the figures representing the weights are placed. These lines are suitably spaced apart and in the space 24 between the curved lines I provide figures indicating the total cost of an article, the price per pound for which appears on the indicator hand opposite the figures in the spaces between the curved lines. For instance, in Fig. 1 I have shown one of the spaces between the curved lines supplied with figures indicating the total cost of an article where the price per pound is 40¢, the mark "40" appearing on the indicator hand opposite these figures. At the price of 40¢ per pound it is evident that on the radial line running to the character indicating one pound the numeral "40" will be placed, and on the line indicating three pounds the numeral "1.20", and so on. At the top of the radial line 22 the curved space is supplied with a series of figures indicating the price for fractions of a pound and for convenience of reading, these figures are arranged in staggered relation to one another.

I have shown in the drawing the dial supplied with figures opposite the prices of 40¢ per pound and 3¢ per pound, while the other spaces between the curved lines are left blank, but it will be understood that in practice these spaces will be filled in with figures appropriate for the pound prices marked on the face of the indicator hand. The method of determining the weight and the cost in pounds and fractions of a pound will be hereinafter more fully explained.

25 is a yoke, having knife edge bearings 26 in hubs 27 which are supported by the walls of the housing 17. This yoke is adapted to oscillate on its bearings and is provided with depending rods 28 on which weights 29 are supported. 30 is a disk having a hub 31 provided with knife edge bearings 32 in the yoke 25, said bearings being coaxial with the bearings 26. A rod 28' depends from the disk 30 and supports a weight 29'. This weight is actuated by a light article on the scale, the yoke and the weights 29 being picked up when a certain predetermined point in the movement of the indicator hand has been reached. A strap 33 is secured to the surface of the disk 30 and depends in the housing 17 through an opening in the base and is secured to one end of a cam 34 which is pivoted at 35 on a lever 36 having bearings 37 within the base of the scale. The cam 34 is provided with an adjusting screw 38 which engages the lever 36 and operates to tilt the cam on its pivot and regulate the movement of the parts to allow for uniform travel of the indicator hand and uniform spacing of the dial. The lever 36 is tilted by means of a link 39 which connects it with the beam frame 5. (See Fig. 2). An arm 40 is mounted on the disk 30 and carries the indicator hand 19' and is provided with an adjusting screw 41 which is adapted to contact with a cam surface 42 provided on the yoke 25. The effect of this contact is to press the pivots of the disk down on their bearings and at the same time tilt the yoke and the weights carried thereby. The function of this device is substantially the same as that shown and described in my patent application Serial No. 642,808, filed August 7, 1911, in which a scale is described as adapted for weighing light articles up to a certain point and when a predetermined weight has been passed the scale will automatically become operative for weighing a heavier load. In this case the same principle is involved, the disk 30 being first actuated by the weight of the load on the scale through the ribbon 33 and its connections to swing the arm 40 and the indicator hand across the graduations of the dial. At a certain point in the travel of the disk the adjusting screw 41 will contact with the cam surface of the yoke and the yoke will be actuated with the weights 29 to increase the resistance to the movement of the scale lever and indicator hand.

On the hub 31 of the disk 30 I provide quadrant-shaped weights 43 capable of rotary adjustment around the hub and secured thereon by means of set screws 44. Adjustable stops 45 are mounted in the disk 30 for limiting the adjustment of the weights 43 in one direction. From an examination of Fig. 4 it will be evident that when the weights 43 are rotated on their support they will exert an increasing pull for effect on the disk and indicator hand as they move from a vertical to a horizontal position. The independent mounting of these weights allows me to adjust one in one direction and the other in the opposite direction, or increase the pull of one weight on the disk and indicator hand and decrease the pull of the other weight exerted in an opposite direction. I am thus able to obtain a uniform travel of the indicator hand on each side of the vertical center of the dial and therefore obtain an accurate travel of the indicator hand at all points on the dial. I have found in scales of this type as ordinarily constructed that it is difficult, if not impossible, to provide for uniform travel of the parts on both sides of the pivot line. That is, if the indicator hand is approaching a vertical position it will, in scales as usually constructed, move more slowly than when it has passed a vertical position and its pivot has passed the center. This is due, probably, to the momentum of the mechanism and the weight of the indicator hand and results in a variation in the travel of the hand and inaccuracy in the weighing result. This difficulty I have avoided by the use of these rotary adjustable weights 43, which are capable of delicate adjustment and will so counter-act the tendency of the indicator hand to move more rapidly at one point than at another that extremely accurate results can be obtained at any point of the dial.

In using the scale, the article to be weighed is placed on the pan and the mechanism being properly balanced, the indicator will move across the face of the dial and indicate in pounds and fractions of pounds the weight of the load on the scale. In the position of the hand shown in Fig. 1, the cost of the article weighed, on the basis of 40¢ per pound, would be 50¢. If the wire of the indicator hand registered with one of the graduations between the marks representing three and four pounds, then the operator would move the poise 10 to the three pound mark on the beam 9. The indicator hand would then move toward the left and indicate the price for the fraction of a pound in excess of three pounds on the graduations at the left hand side of the dial. This amount, added to the price for three pounds at 40¢ per pound, would indicate the total cost of the article. I am thus able to ascertain more accurately than usual in scales of this kind the exact weight and the exact price for that weight.

A dash-pot device 46 is provided in connection with the beam frame 5 and acts as a control for the movement of the beam.

I claim as my invention:

1. In a scale, a dial having a portion of its face graduated in fractions of ounces and a portion in fractions of pounds, an indicator hand adapted to sweep across the face of said dial and having characters thereon representing the price per pound of the article to be weighed, and said dial having characters opposite the marks on said indicator hand and representing the price in pounds, ounces and fractions thereof, a pivoted beam and poise operatively connected with said indicator hand, means for resisting the movement of said hand on the fractions of ounces portion of the dial and for offering an increased resistance to the movement of said hand on the fractions of pounds portion of the dial, the adjustment of said poise to the weight in pounds indicated by said hand when the weight on the scale is in excess of such number of pounds causing said hand to swing back over the fractions of ounces portion of said dial and indicate thereon the ounces in excess of the number of pounds and the amount to be added to the price in pounds for the total cost of the article to be weighed.

2. In a scale, a dial having a portion of its face graduated in fractions of ounces up to one pound and the remaining portion in fractions of pounds, an indicator hand mounted to sweep across the face of said dial and having characters thereon representing the price per pound of the article to be weighed, said dial also having on curved lines opposite the figures on said indicator hand characters representing the price in pounds, ounces and fractions thereof, means for resisting the movement of said hand over that portion of the dial graduated in fractions of ounces and for offering an increased resistance to the movement of said hand over that portion of the dial graduated in pounds, means for balancing the load on the scale indicated in pounds by the indicator hand and thereby causing said hand to move backwardly over that portion of the dial graduated in fractions of ounces and indicate thereon the weight of the load in excess of the pounds previously indicated by said hand and the cost of the weight in fractions of ounces added to the price in pounds indicating the total cost of the article weighed.

3. A scale dial having a series of curved lines thereon, spaced apart, and also having straight radial lines intersecting said curved lines, an indicator hand having characters thereon representing the price per pound arranged opposite the spaces between said curved lines, said spaces containing figures representing the cost in ounces and pounds, a portion of the surface of said dial being graduated at the end of said radial lines to indicate pounds and having figures on said radial lines between said curved lines indicating the total cost for the different prices per pound, the remaining portion of the dial having graduations indicating ounces and the total of the cost of the ounces in excess of the total pounds, means for resisting the movement of the indicator hand across the face of the dial, means for balancing the load in pounds on the scale, said indicator hand swinging backwardly when the pounds of the load are balanced to indicate on the fractions of ounces portion of the dial the number of ounces of the load in excess of the pounds graduation, for the purpose specified.

In witness whereof, I have hereunto set my hand this 11th day of February 1916.

NILS NILSON.

Copies of this patent may be obtained for five cents each, by addressing the "Commissioner of Patents, Washington, D. C."